March 2, 1954

O. E. HINTZ ET AL 2,670,583

DYNAMICALLY BALANCED MOWER

Filed Dec. 7, 1951

INVENTORS
OTTO E. HINTZ
ERNEST C. CARLSON
ROBERT C. MINER

Paul O. Pippel
Atty

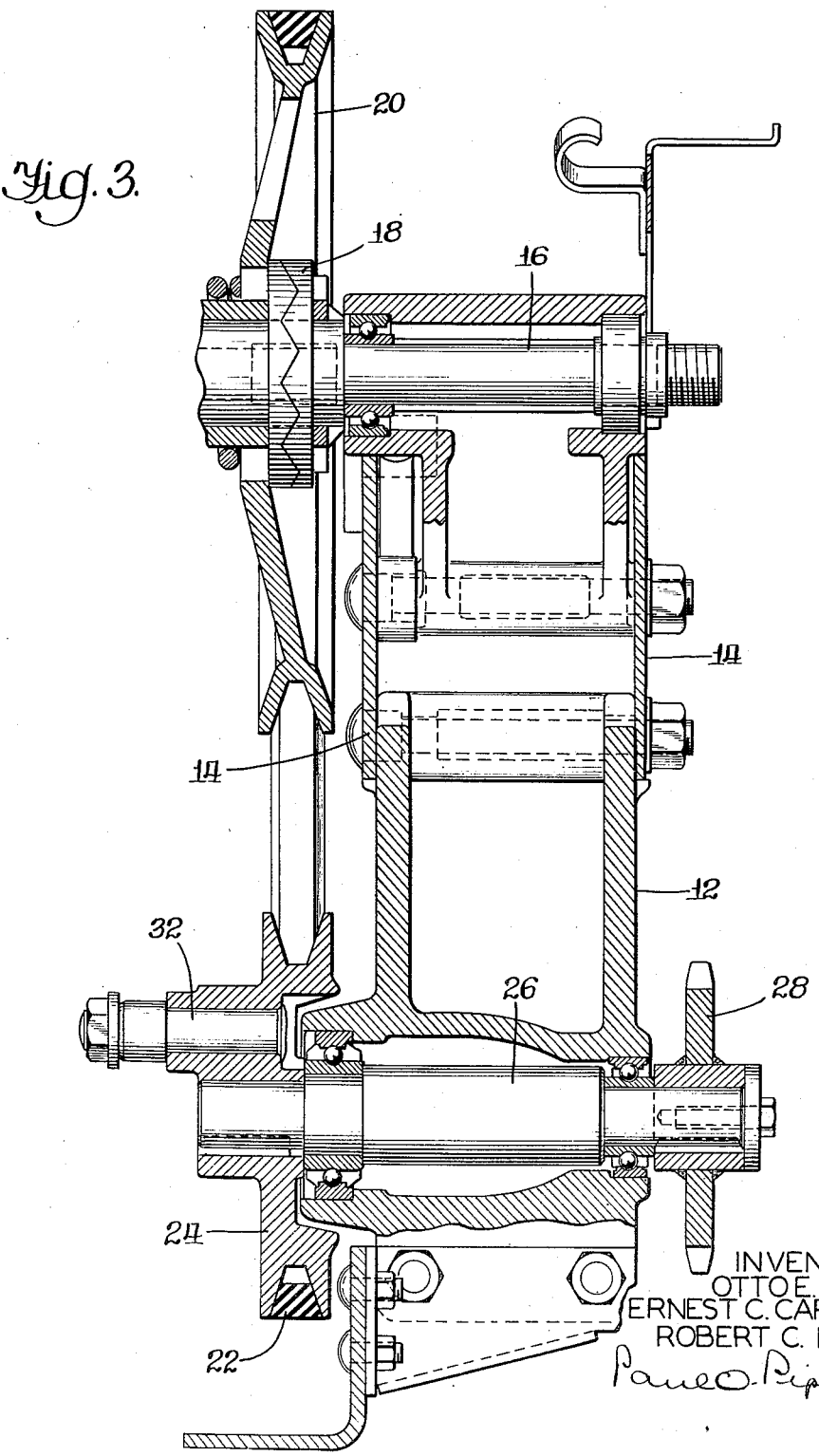

Patented Mar. 2, 1954

2,670,583

UNITED STATES PATENT OFFICE 2,670,583

DYNAMICALLY BALANCED MOWER

Otto E. Hintz, Riverside, Ernest C. Carlson, Chicago, and Robert C. Miner, Berwyn, Ill., assignors to International Harvester Company, a corporation of New Jersey Application December 7, 1951, Serial No. 260,542

14 Claims. (Cl. 56—25)

This invention relates to mowers of the pitman-driven-reciprocating-knife type.

Mowers of this class, which comprise a support bar mounting a reciprocating knife are favored because of their simplicity, proven efficiency, low maintenance and initial cost and other equally obvious considerations. Many refinements have been made in the basic design to improve the speed of the knife until the calculated operating limit was reached and further attempts to merely increase the operating speed of the knife have engendered excessive high stress vibrations, which shattered or otherwise rapidly destroyed the parts. This limitation dictated a less than optimum traversing speed for the mower.

A general object of the invention is to devise a simple and inexpensive mower of the standard type wherein the parts are arranged to cooperate in a novel manner to establish a dynamically balanced action whereby the speed of operation of the mower may be materially increased without the attendant destructive vibrations.

The invention contemplates a novel balanced system for operating the cutter wherein the ground engaging support bar and the knife are oppositely reciprocated to produce a dynamically balanced action and wherein the support bar is moved a minimum distance transversely of the direction of traverse of the cutter to preclude the bar from digging into the soil and uprooting or destroying the grasses.

A more specific object is to provide a novel balancing action between the ground-engaging slab of the cutter and the knife by reciprocating the same 180 degrees out of phase with each other.

A further object is to provide simple means for effecting a dynamic balance between the knife and carrying slab and comprising a pair of eccentrics connected to a pitman and a coupling member, respectively, the pitman being connected to the knife and the coupling member to the slab.

Another object is to arrange for the shoes or runners which carry the slab to slide upon the ground thereby developing varying friction which functions to prevent amplification or generation of harmonics in the system.

An additional object is to support the slab lightly upon the ground through counter-balancing means so as to control the frictional drag and minimize the resultant unbalancing factors.

The invention further contemplates an arrangement which may be readily incorporated in mower constructions currently in use.

These and other objects of the invention will become more apparent from the specification and the drawings wherein:

Figure 3 is a fragmentary enlarged sectional view taken substantially on the line 3—3 of Figure 1.

Figure 5 is a fragmentary end view of the mower with the runner at the near end removed to clarify the illustration.

Figure 1:
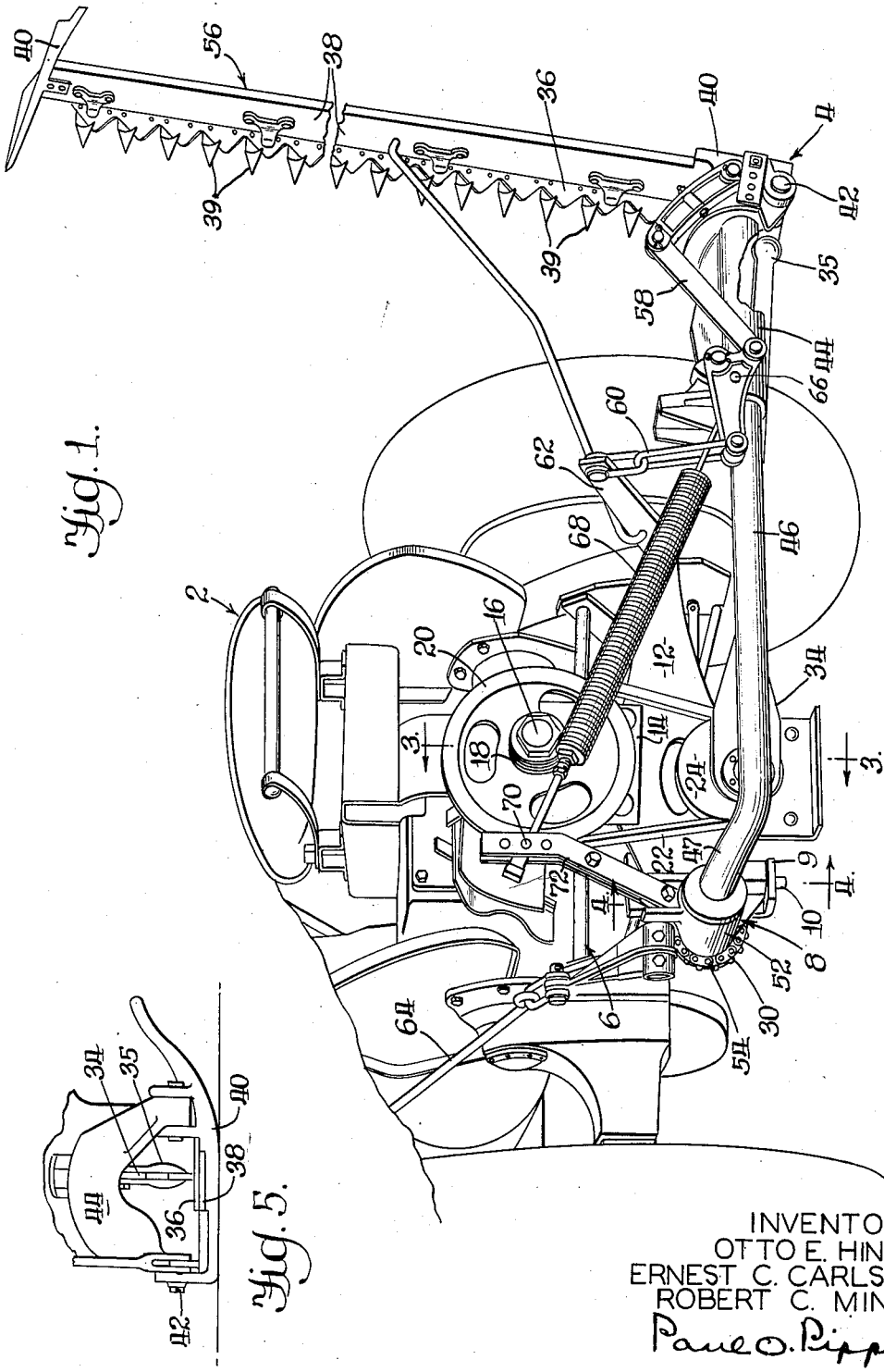
Figure 1 is a rear perspective view of a tractor with a mower attached therebehind and incorporating the invention the cutter being shown in transport position and a portion of the yoke being broken away to clarify the illustration.
Figure 2:
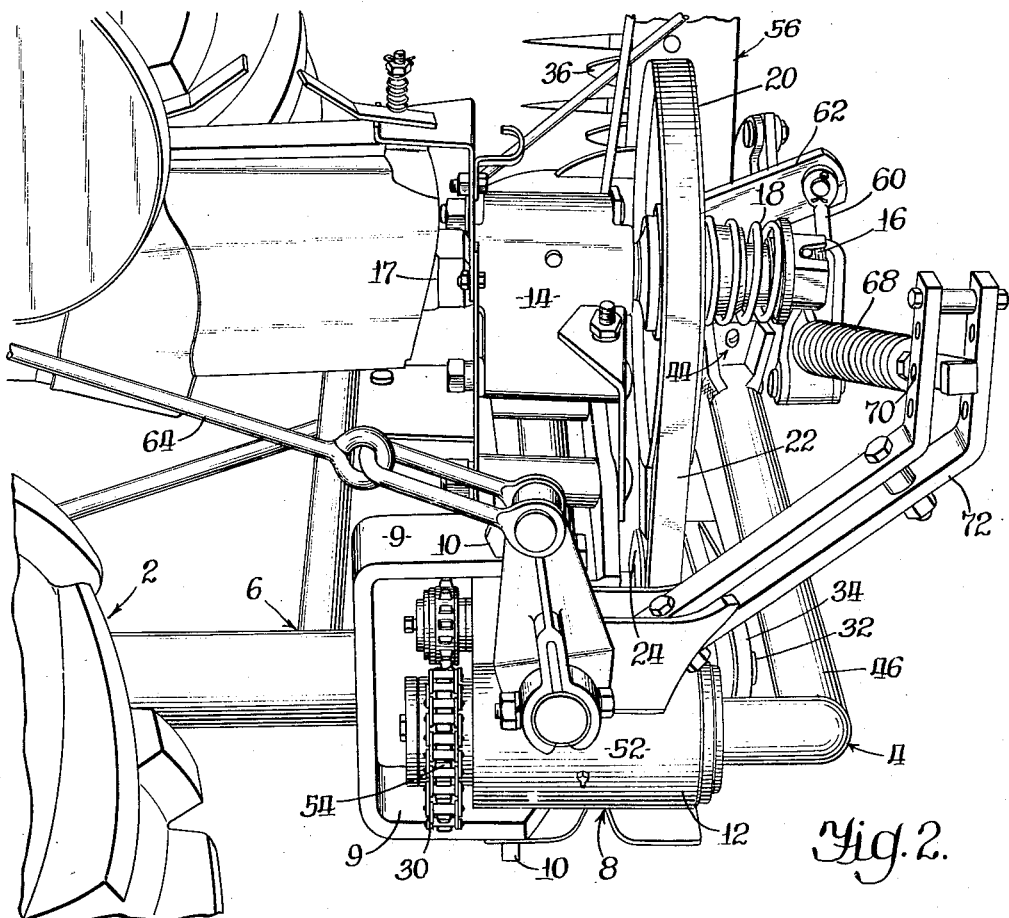
Figure 2 is an enlarged fragmentary side perspective view taken from the left as seen in Figure 1.
Figure 4:
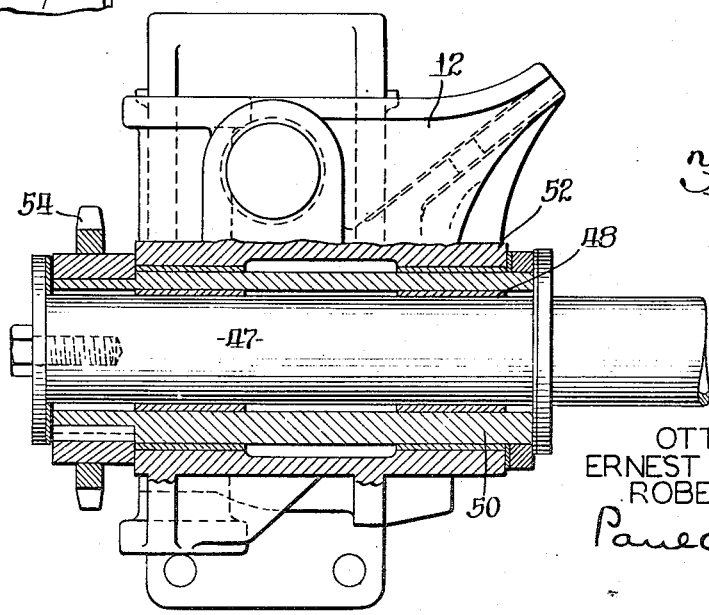
Figure 4 is an enlarged sectional view taken generally on the line 4—4 of Figure 1.

The invention is illustrated in association with a conventional tractor generally indicated 2, to which is connected a mower assembly broadly designated 4. The mower and its connection to the tractor may be such as shown in S. E. Hilblom, U. S. Patent 2,403,365, and may comprise a U-shaped hitch frame 6 designed to accommodate vertical oscillation of the mower, and a mower-frame 8 which at one end is pivoted by means of a bolt 10 on a substantially vertical axis to the hitch frame between the jaw members 9 thereof to accommodate swinging movement on a substantially vertical axis of the mower-frame and the mower assembly connected thereto upon the mower assembly striking an obstruction. The two frames are releasably interconnected as well known to those skilled in the art and which may be as shown in said patent.

The mower-frame comprises a casting 12 which is elongated transversely of the tractor, the casting supporting a bracket 14 thereabove. The bracket 14 rotatably mounts a shaft 16 which at its forward end is flexibly connected to the rear end power take-off shafting 17 of the tractor and at the opposite end is connected through a slip-clutch 18 to a pulley fly-wheel 20 about which is trained a V-belt 22 which drives a pulley or eccentric 24 disposed below pulley 20 and mounted on a shaft 26 parallel to shaft 16 and journaled in the casting 12, the shaft 26 having its forward end keyed to a sprocket 28 about which is trained a chain 30 positioned alongside the forward face of the casting 12. The member 24 is provided with a wrist pin 32 rotatably connected to one end of a pitman 34, the opposite end of the pitman being connected by a ball and socket joint 35 in standard manner to the stubbleward end of a knife 36.

The knife 36 is slidably supported in conventional manner upon a slab or support bar or finger element 38, which, through conventional runners or shoes 40 supports the assembly on the ground. The slab 38 is provided with cutters 39 fixed thereto and is pivotally connected at its inboard end by pins 42 to a yoke 44 which in turn is connected to one end of a coupling or push-bar 46, the push-bar 46 having its end remote from the cutter angled forwardly to provide a normal extension 47 extending within a bearing 48 rotatably mounted within a cam member 50 on an axis generally parallel to the shaft 26. The cam member 50 is in turn rotatably mounted within a bearing portion 52 located in the right end of the casting 12.

The cam 50 mounts the extension 47 of the coupling member eccentrically of the axis of rotation of the cam member and is out of phase with the wrist pin driving the pitman by 180 degrees. In the present embodiment it has been determined that a quarter of an inch movement of the coupling bar, namely an eighth in each direction, is sufficient to accomplish the results hereafter described. The cam member 50 is connected or keyed to a sprocket 54 which is driven by the before-mentioned chain 30.

The cutter assembly generally designed 56 is liftable about a horizontal axis provided by pin 42 by means of a lifting linkage 58 of conventional design, said linkage being connected to the stubbleward end of the support bar of the cutter and mounted on the yoke. The far end of the linkage 58 with respect to the cutter mechanism is connected by means of a clevis assembly 60 to a rock shaft 62 which may be powered in any suitable manner through a pull rod 64. It will be appreciated that in operating position of the cutter bar the clevis 60 is loose and therefore does not interfere with the reciprocating movement of the mower bar and coupling rod. The lifting linkage is also connected as at 66 to one end of a tension balance spring or yieldable adjusting means 68, the opposite end of which is anchored as at 70 to a standard 72 fixedly mounted on the casting 12.

It will be appreciated that the cutter mechanism is connected to the casting 12 my means of the pitman and the coupling rod, and that the mass movable with the coupling rod times its acceleration is substantially equal to the mass times the acceleration of the pitman and the parts moved thereby. Since the movement of the two is directly opposite of each other at all times, a dynamic balance is established. The travel of the coupling rod also takes into account the load of the balancing spring. Inasmuch as wear of the parts changes their mass as well as their travel, there is a constant tendency for the unit to become unbalanced. This in turn tends to generate a harmonic oscillation which, if uncontrolled, would amplify to destructive proportions. The present invention disrupts this tendency by employing the varying frictional resistance developed between the shoes on the support member of a cutter and the ground engaged thereby. The variability of the contour of the ground engaged by the shoes and the frictional characteristics thereof provide a satisfactory solution to the problem. The balancing spring lifts the cutter off the ground so that minimum frictional drag develops insufficient to produce any pronounced effect on the dynamic balancing.

It will be observed that the invention is obviously adapted for use with standard mowers and provides a compact package. The oscillation of the coupling bar and the pitman are arranged along substantially parallel lines and the movement of the support member is so small, namely, an eighth of an inch in each direction so as not to perceptibly affect normal mowing operation. The eccentrics are disposed at opposite sides of the pivot to balance the reaction.

What is claimed is:

1. A mower comprising an attachment frame, a support bar having cutters fixed thereto, ground engaging means on the bar, a knife blade slidably mounted on the bar in shearing relationship with said cutters for relative longitudinal movement therewith, a coupling member connected to the support bar, cam means rotatively mounting said coupling member on the frame on an axis transverse to said cutter, a pitman connected to the blade, an eccentric mounted on said frame on an axis parallel to said first mentioned axis, and connected to the pitman, said cam member and said eccentric being disposed 180 degrees out of phase with each other, means coupling said eccentric and cam member in said relationship, and means for driving the same, said cam member being formed and arranged to move said support bar together with the ground engaging means and coupling member a distance to produce a force factor substantially equal to and opposing that generated by the pitman, knife blade and eccentric, said ground engaging means adapted to slide upon the ground to develop frictional resistance therewith retarding oscillatory movement of said support bar and the coupling member attached thereto.

2. A mower assembly comprising a mounting frame adapted for attachment to an associated tractor, said frame including a transverse elongated member, a mower disposed at one end of the member and extending longitudinally therefrom, said mower comprising a ground engaging cutter element and a blade carried by said element, said blade and element being movable relatively longitudinally, a pitman connected to the blade, a coupling bar connected to the element, an eccentric rotatably mounted on said member intermediate its ends and operatively connected to said pitman, another eccentric rotatably mounted on the member at the end thereof remote from the cutter, said eccentrics being coupled together 180 degrees out of phase with each other, and means carried by the member for coupling said eccentrics to a power source, said eccentrics being rotatable about generally parallel axes and shifting the parts connected thereto in opposing directions to produce a substantially balanced force couple.

3. A mower assembly comprising a mounting framework, a mower on one side of the framework and including a support bar with cutters fixed thereon and having a ground engaging surface, a knife blade carried by said bar and reciprocal longitudinally with respect thereto and disposed in shearing relationship to said cutters, a pitman connected at one end to the stubbleward end of the knife blade, an eccentric connected to the other end of the pitman and rotatably mounted on the framework, a push rod having one end connected to the stubbleward end of the bar and having a length generally paralleling said pitman, another eccentric rotatively mounted on the framework and spaced laterally with respect to said first-mentioned eccentric and rotatable on an axis generally parallel therewith, a chain and sprocket system interconnecting said eccentrics, said rod having a generally normal extension at the other end thereof rotatably mounted in said second-mentioned eccentric, said eccentrics being oriented at a straight angle out of phase with each other, and the acceleration of movement of the respective eccentrics times the mass moved thereby being substantially equal.

4. A mower assembly comprising a mounting frame, a mower comprising a ground engaging support member with cutters fixed thereto, a knife blade movably mounted thereon in shearing relationship thereto, a coupling arm connected to said member and extending generally longitudinally thereof, a pitman connected to the knife blade and extending generally longitudinally thereof, eccentrics connected to the pitman and the coupling arm, respectively and mounted on the frame, means coupling said eccentrics, driving means coupled with said eccentrics, a balancing spring reacting between the support member and the frame in lifting relationship to the former for reducing the drag thereof on the ground and oriented substantially in parallel with said pitman and coupling arm, said eccentrics being arranged 180 degrees out of phase with each other for simultaneously reciprocating the parts connected thereto in opposite directions longitudinally of the cutter, the mass of which said support member forms a part being substantially greater than the mass of which the knife blade is part and the distance of movement of the first-mentioned mass being proportionately lesser than of the second mentioned mass and of the order such as to balance the inertia of the masses against each other.

5. In a mower, a hitch part adapted for connection to an associated tractor, a frame, a pivot member interconnecting said frame to the hitch part on a substantially vertical axis, a cutter mechanism including a plurality of relatively movable elements at one side of the frame, eccentrics mounted on the frame, said eccentrics being phased 180 degrees apart, and a coupling arm connected to each element and to respective eccentrics, said eccentrics being positioned in immediate proximity of the pivot member at diametrically opposite sides thereof to reduce transverse loading on said pivot member to a minimum.

6. In a mower assembly, a mower mechanism comprising a ground engaging support element having cutters and a knife blade reciprocally mounted thereon in shearing relationship with the cutters, a support structure comprising a member elongated transversely to the direction of travel of the mower, a bracket connected to the top side of said member, a shaft journaled in said bracket transversely of the member, means for connecting one end of the shaft to associated driving means, a flywheel pulley connected to the other end of the shaft, a shaft member journaled in said frame member generally parallel to said shaft, a pulley keyed to the one end of the shaft member, a belt trained about said pulleys, a sprocket keyed to the other end of the shaft member, a hollow cam element journaled in said frame member generally parallel to said shaft member and spaced laterally thereof, a sprocket keyed to the one end of the cam, a chain trained about said sprockets and positioned therewith along the one side of said frame member, a coupling arm extending along the opposite side of said frame member and having an angled extension journaled in the cam member, a wrist pin mounted eccentrically on said second mentioned pulley, a pitman having one end rotatably mounted on the wrist pin, said pitman and coupling arm positioned generally parallel, said coupling arm and pitman pivotally connected at corresponding ends to the stubbleward ends of said support element and knife blade, respectively, said wrist pin and cam member being arranged 180 degrees out of phase with each other whereby the parts connected thereto are caused to reciprocate in opposing directions, the mass associated with said cam member being substantially greater than the mass associated with the wrist pin whereby the distance of reciprocating movement of the first mass is proportionately substantially less than that of the second mass and of the order to produce a substantially balanced inertia couple.

7. In a mower of the type described, a hitch member, a mower assembly including a frame member, one of said members comprising a jaw including spaced top and bottom elements, the other member comprising a portion fitting therebetween, a pivot part extending through said elements and affording a rotatable connection therebetween on a substantially vertical axis, a pair of laterally spaced eccentrics journaled on the frame member at opposite sides of said pivot part, a cutter comprising supporting and supported sections and extending outwardly from one side of the frame member transversely to the direction of travel thereof, a coupling between each eccentric and respective sections, and a driving connection between said eccentrics extending at one side of said pivot part between said top and bottom elements of said jaw.

8. In a mower, a frame, a multisection cutter and a plurality of eccentrics journaled on the frame and each connected to a different section of the cutter for reciprocating the same longitudinally of the cutter, said eccentrics being phased to obtain a substantially balanced inertia couple between all of said sections, and one of said sections comprising ground engaging means adapted to slide upon the ground to thereby develop harmonics-disruptive frictional resistance.

9. In a mower, mounting means, a cutter including supporting and supported relatively longitudinally movable sections, said supporting section arranged to slide directly upon the ground to effect frictional resistance to movement thereof, means for simultaneously reciprocating said section in directly opposed directions, said last-mentioned means arranged to move said supporting section a distance substantially less than the supported section and of the order to compensate for the frictional drag occasioned between the supporting section and the ground to obtain an approximately balanced inertia couple between said sections, said movement of the supporting section being of the order to maintain substantially maximum cutting width of the cutter during its transverse along a field.

10. A mower comprising a cutter including a pair of sections of radically different mass characteristics, and means for reciprocating said sections in direct opposition to each other such distances as to effect a substantially balanced inertia couple, one of said sections frictionally sliding longitudinally upon the ground and having a mass characteristic such as to require minimum movement consistent with effecting a balance couple whereby obtaining maximum cutting width of the mower.

11. In a mower, a cutter comprising a ground engaging finger element and a knife element supported thereby in shearing relationship therewith, means for reciprocating said elements in opposing directions and concomitantly sliding said ground engaging element upon the ground to develop friction therewith in opposition to said reciprocation thereof, the extent of movement of respective elements being of the order to produce a substantially balanced inertia couple.

12. A mower according to claim 11 and including an ambulant support structure, means movably mounting said finger element on said structure for movement of the cutter toward and away from the ground, and adjusting means connected between said ground engaging finger element and said structure and adapted to maintain the cutter in adjusted position relative to the ground and said finger element engaged with the ground under controlled pressure to thus regulate the friction characteristics developed between the finger element and the ground in opposition to reciprocal movement of the finger element and consistent with and of the order to obtain a substantially balanced inertia couple between said elements and to disrupt harmonics between said elements.

13. A mower according to claim 11, and comprising an ambulant field traversing frame structure, means movably mounting the finger element on the frame structure for positioning the cutter relative to the ground, said finger element engaging the ground, and yieldable adjustable means connected between said frame structure and the finger element in counter-balancing relationship to the cutter for adjusting the pressure at which the finger element engages the ground.

14. The combination according to claim 13 and said yieldable adjustable means comprising spring means oriented to develop substantially vertical and horizontal components said horizontal components acting in parallel with said finger element, and said vertical component disposed in lifting relationship to said cutter.

OTTO E. HINTZ.
ERNEST C. CARLSON.
ROBERT C. MINER.

References Cited in the file of this patent

UNITED STATES PATENTS

| Number | Name | Date |
|---|---|---|
| 773,989 | Sammer | Nov. 1, 1904 |
| 1,910,447 | Rayniak | May 23, 1933 |